United States Patent
Oh et al.

(10) Patent No.: US 7,764,445 B2
(45) Date of Patent: Jul. 27, 2010

(54) OPTICAL SYSTEM

(75) Inventors: Hye Ran Oh, Gyunggi-do (KR); In Cheol Chang, Gyunggi-do (KR); Seok Cheon Lee, Gyunggi-do (KR); Young Su Jin, Gyunggi-do (KR); Cheong Hee Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 143 days.

(21) Appl. No.: 12/076,011

(22) Filed: Mar. 12, 2008

(65) Prior Publication Data

US 2009/0086339 A1    Apr. 2, 2009

(30) Foreign Application Priority Data

Sep. 27, 2007    (KR) .................. 10-2007-0097579

(51) Int. Cl.
*G02B 9/06* (2006.01)
*G02B 9/00* (2006.01)

(52) U.S. Cl. .................. 359/794; 359/796; 359/797

(58) Field of Classification Search .......... 359/791, 359/792, 794, 796, 797
See application file for complete search history.

(56) References Cited

U.S. PATENT DOCUMENTS

| | | | |
|---|---|---|---|
| 2,175,518 A * | 10/1939 | Djian ............ | 359/715 |
| 5,050,974 A * | 9/1991 | Takasugi et al. ............ | 359/728 |
| 7,342,731 B2 * | 3/2008 | Lee et al. .............. | 359/772 |
| 7,457,053 B2 * | 11/2008 | Oh et al. ............. | 359/793 |
| 2003/0043473 A1 * | 3/2003 | Okuyama ............ | 359/659 |
| 2003/0048544 A1 * | 3/2003 | Hashimura et al. ......... | 359/717 |
| 2006/0087725 A1 * | 4/2006 | Arriola ................ | 359/357 |
| 2009/0225441 A1 * | 9/2009 | Do ................ | 359/716 |

FOREIGN PATENT DOCUMENTS

| | | |
|---|---|---|
| JP | 2002-150594 | 5/2002 |
| JP | 2003-5033 | 1/2003 |

OTHER PUBLICATIONS

English translation of Korean Office Action issued May 6, 2009 in corresponding Korean Patent Application 10-2007-0097579.

* cited by examiner

*Primary Examiner*—Jordan M. Schwartz (57) ABSTRACT

An optical system is mounted in a mobile communication terminal and a personal digital assistant (PDA) for a monitoring camera and a digital camera. The optical system includes: a first optical element formed in a meniscus shape entirely convex toward an object and having a positive refractive power; and a second optical element having an object-side surface convex toward the object and an image-side surface formed of a plane, wherein the second optical element includes: a fourth optical element having an object-side surface entirety convex toward the object on the optical axis; and a fifth optical element having an object-side surface in contact with an image-side surface of the fourth optical element, and an image-side surface and an object-side surface formed of planes respectively.

10 Claims, 8 Drawing Sheets

OPTICAL SYSTEM

CROSS-REFERENCE TO RELATED APPLICATIONS

This application claims the priority of Korean Patent Application No. 2007-0097579 filed on Sep. 27, 2007, in the Korean Intellectual Property Office, the disclosure of which is incorporated herein by reference.

BACKGROUND OF THE INVENTION

1. Field of the Invention

The present invention relates to an optical system, and more particularly, to a subminiature optical system mounted on a mobile communication terminal and a personal digital assistant or used for a monitoring camera and a digital camera.

2. Description of the Related Art

In general, early mobile communication terminals have only a communication function. However, as use thereof is increased, various services such as photographing, image transmission, and Internet, etc are provided, thereby continuously developing functions and services thereof. Recently, mobile communication terminals of a new extended concept, such as, so called, camera mobile phones come in to the spotlight, where techniques for digital cameras and mobile phones are integrated.

Particularly, with respect to an optical system mounted on a camera mobile phone, a small size, light weight, and low price are required. Also, as a pixel size of an image sensor such as a charge-coupled device (CCD) or complementary metal-oxide semiconductor (CMOS) becomes smaller and smaller, a high resolution is required in an optical system using such image sensor.

Also, to satisfy a small size and low price, it is required to reduce a number of lenses of an optical system mounted on a small device such as a mobile phone. However, there is less degree of freedom in design and it is difficult to satisfy optical performance thereof.

Also, when an optical system including a plurality of refractive surfaces, a number of refractive surfaces to be managed when manufacturing and assembling lenses is increased, thereby complicating a lens manufacturing process and increasing manufacturing costs.

Accordingly, there is required a subminiature optical system capable of reducing a size thereof and easily mounting lenses thereon while having a high resolution and less aberration.

SUMMARY OF THE INVENTION

An aspect of the present invention provides a subminiature optical system in which a number of refractive surface to be managed in manufacturing and assembling lenses, thereby simplifying a lens manufacturing process and reducing manufacturing costs.

An aspect of the present invention also provides a subminiature optical system capable of conveniently correcting various aberrations such as chromatic aberration, distortion, astigmatism, and spherical aberration while having a small number of lenses.

An aspect of the present invention also provides a subminiature optical system using only two lenses, which is not only subminiaturized but also has a high resolution.

An aspect of the present invention also provides a subminiature optical system capable of being easily mass-produced but also having various excellent optical performances.

According to an aspect of the present invention, there is provided a subminiature optical system including: a first lens formed in a meniscus shape entirely convex toward an object and having a positive refractive power; and a second lens having an object-side surface convex toward the object and an image-side surface formed of a plane.

The first lens may include: a first optical element having an object-side surface convex toward the object on an optical axis; a second optical element having an object-side surface in contact with an image-side surface of the first optical element; and a third optical element having an object-side surface in contact with an image-side surface of the second optical element and an image-side surface concave toward an image on the optical axis. The second lens may include: a fourth optical element having an object-side surface convex toward the object on the optical axis; and a fifth optical element having an object-side surface in contact with an image-side surface of the fourth optical element and an image-side surface formed of a plane.

In this case, the object-side surface and the image-side surface of the second optical element may be formed of planes, respectively.

The first lens may include one or more refractive surface formed of aspherical surface.

A refractive index of one or more of the first optical element to the third optical element may be different from a refractive index of other optical elements, and a refractive index of the fourth optical element may be different from that of the fifth optical element.

On the other hand the second lens may have a positive refractive power.

One or more of following Conditional Expressions may be satisfied, The following Conditional Expressions are Conditional Expression 1 related to a curvature radius r4 of a refractive surface closest to the image in the first lens and a curvature radius r5 closest to the object in the second lens, Conditional Expression 2 related to a distance D12 on the optical axis from the refractive surface closest to the image in the first lens to the refractive surface closest to the object in the second lens, and Conditional Expression 3 related to a curvature radius r1 of a refractive surface closest to the object in the first lens, $0.8 < r4/r5 < 1.2$ ... Conditional Expression 1, $0.05 < D12/TL < 0.1$ ... Conditional Expression 2, and $0.5 < r1/f < 0.7$ ... Conditional Expression 3, wherein TL indicates a distance from the refractive surface closest to the object to an imaging plane and f indicates an overall focal length of the optical system.

A shielding layer blocking unnecessary light may be installed on one or more of refractive surfaces included in the second optical element and fifth optical element.

According to another embodiment of the present invention, there is provided a subminiature optical system including: a first lens entirely having a positive refractive power and including a first optical element having an object-side surface convex toward the object on an optical axis; a second optical element having an object-side surface in contact with an image-side surface of the first optical element; and a third optical element having an object-side surface in contact with an image-side surface of the second optical element and an image-side surface concave toward an image on the optical axis; and a second lens entirely having a positive refractive power and including a fourth optical element having an object-side surface convex toward the object on the optical axis; and a fifth optical element having an object-side surface in contact with an image-side surface of the fourth optical element and an image-side surface formed of a plane.

One or more of following Conditional Expressions may be satisfied, The following Conditional Expressions are Conditional Expression 1 related to a curvature radius r4 of a refractive surface closest to the image in the first lens and a curvature radius r5 closest to the object in the second lens, Conditional Expression 2 related to a distance D12 on the optical axis from the refractive surface closest to the image in the first lens to the refractive surface closest to the object in the second lens, and Conditional Expression 3 related to a curvature radius r1 of a refractive surface closest to the object in the first lens, $0.8 < r4/r5 < 1.2$ ... Conditional Expression 1, $0.05 < D12/TL < 0.1$ ... Conditional Expression 2, and $0.5 < r1/f < 0.7$ ... Conditional Expression 3, wherein TL indicates a distance from the refractive surface closest to the object to an imaging plane and f indicates an overall focal length of the optical system.

According to an exemplary embodiment of the present invention, since an image surface of a second lens is formed of a plane, a number of refractive surfaces to be managed while manufacturing and assembling lenses is reduced, thereby simplifying a manufacturing process and reducing manufacturing costs.

According to an exemplary embodiment of the present invention, there is also provided a subminiature optical system in which spherical, aspherical, and plane surfaces are suitably mixed and shapes of refractive lens surfaces are suitably formed, thereby being subminiaturized and having a high resolution.

According to an exemplary embodiment of the present invention, there is also provided a subminiature optical system capable of efficiently correcting chromatic aberration, distortion, astigmatism, and spherical aberration while having a small number of lenses, by using first lens formed of three lens elements and a second lens formed of two lens elements.

According to an exemplary embodiment of the present invention, a replica method may be used, thereby manufacturing first and second lenses in a wafer style, which is suitable for mass production.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

The present invention provides a subminiature optical system capable of not only efficiently correcting various aberrations such as chromatic aberration, distortion, astigmatic aberration, and aspherical aberration by using a first lens formed of three optical elements and a second lens formed of two optical elements while having a small number of lenses but also reducing a number of refractive surfaces to be managed in such a way that it is possible to easily install lenses and to reduce manufacturing costs.

Since it is possible to apply a replica method to the present invention, mass production is easy and a subminiature optical system having excellent performance is provided.

Figure 1:
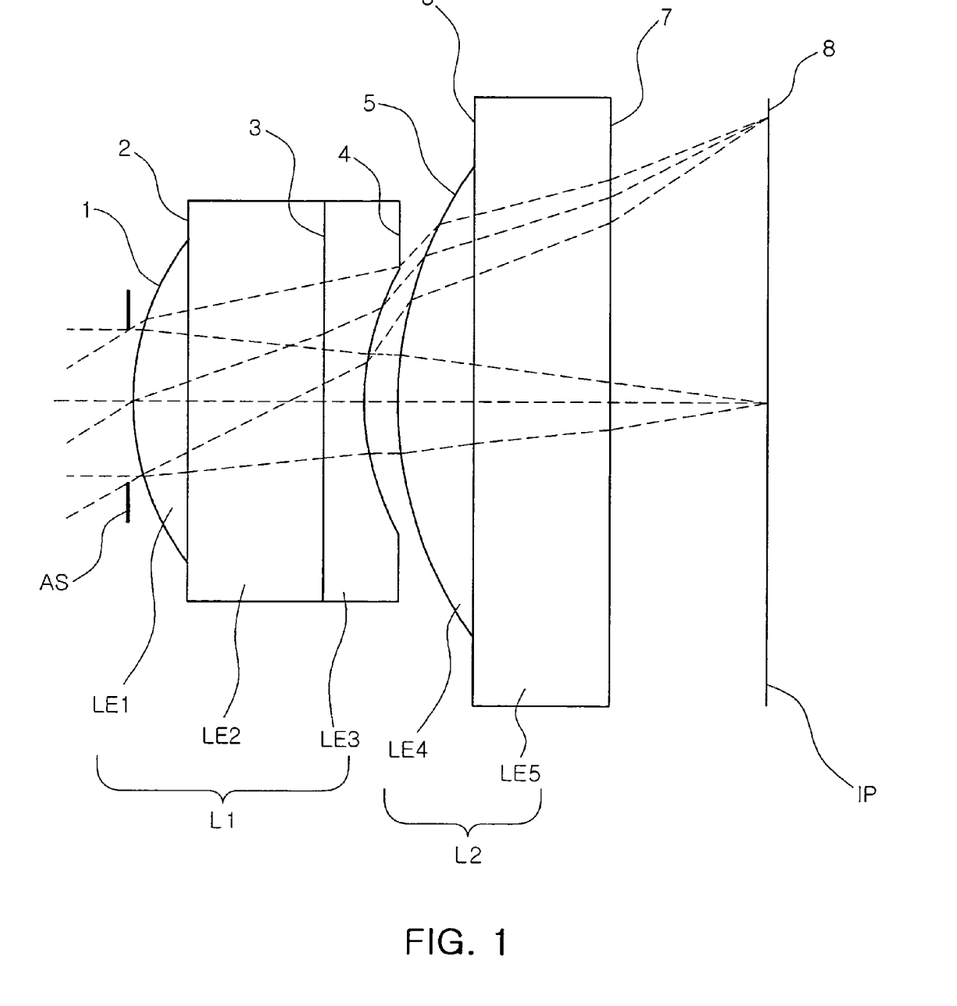
FIG. 1 is a diagram illustrating a lens configuration of a subminiature optical system according to a first embodiment of the present invention.

FIG. 1 is a diagram illustrating a lens configuration of a subminiature optical system according to a first embodiment of the present invention. In FIG. 1, a thickness, size, and shape of a lens are a little exaggerated for description. Particularly, shapes of spherical and aspherical surfaces, which are shown in FIG. 1, are just an example and present invention is not limited thereto.

Referring to FIG. 1, the subminiature optical system includes a first lens L1, a second lens L2, an image sensor (not shown) corresponding to an imaging plane IP, in an order from an object. An aperture stop AS shielding unnecessary light may be installed in a suitable position such as a front of the first lens L1.

The first lens L1 is formed in a meniscus shape entirely convex toward the object and having a positive refractive power. The second lens L2 has an object-side surface convex toward the object and a top surface formed in a plane.

In this case, the first lens L1 may include a first optical element LE1 having an object-side surface convex toward the object on an optical axis, a second optical element LE2 having an object-side surface in contact with an image-side surface of the first optical element LE1, and a third optical element LE3 having an object-side surface in contact with an image-side surface of the second optical element LE2 and an image-side surface concave toward an image on the optical axis, which are totally three.

Also, the second lens L2 may include a fourth optical element LE4 having an object-side surface convex toward the object on the optical axis; and a fifth optical element LE5 having an object-side surface in contact with an image-side surface of the fourth optical element LE4 and an image-side surface formed of a plane, which are totally two.

The image sensor corresponds to the imaging plane IP and is formed of charge-coupled device (CCD) or complementary metal-oxide semiconductor (CMOS) to sense and convert a light image permeating the first lens L1 and second lens L2 into an electrical signal.

Also, the aperture stop AS may be installed in front or inside of an object-side surface 1 of the first lens L1 and a shielding layer capable of preventing a flare by shielding from unnecessary light may be installed on the object-side surface or the image-side surface of the second optical element LE2.

An infrared filter or a cover glass may be installed in back of the second lens L2, corresponding to an optical low pass filter, color filter, and a face plate. On the object-side surface or image-side surface of the fifth optical element LE5, a shielding layer capable of shielding from unnecessary light may be installed (refer to M of FIGS. 5 and 7).

Figure 5:
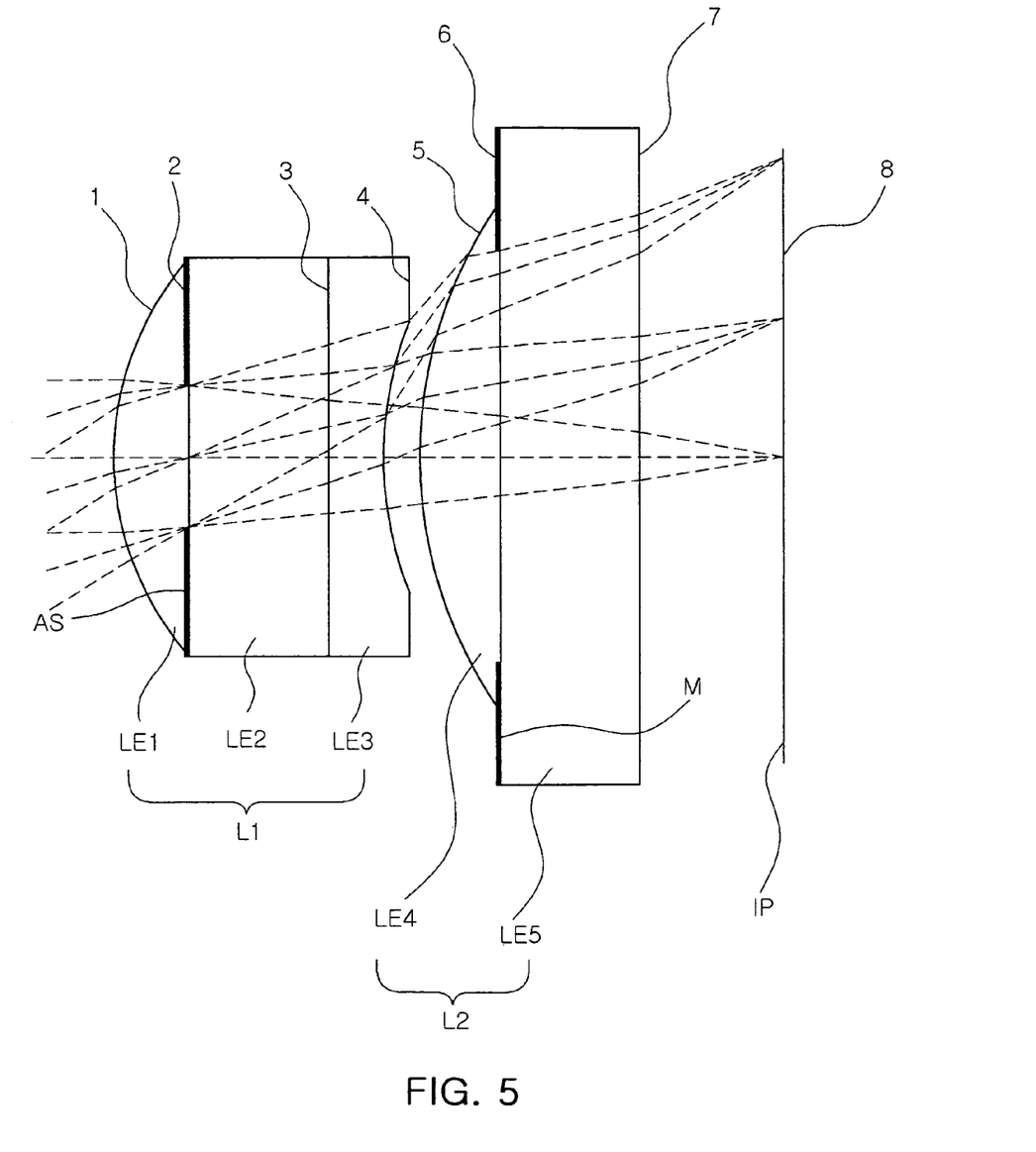
FIG. 5 is a diagram illustrating a lens configuration of a subminiature optical system according to a third embodiment of the present invention.
Figure 7:
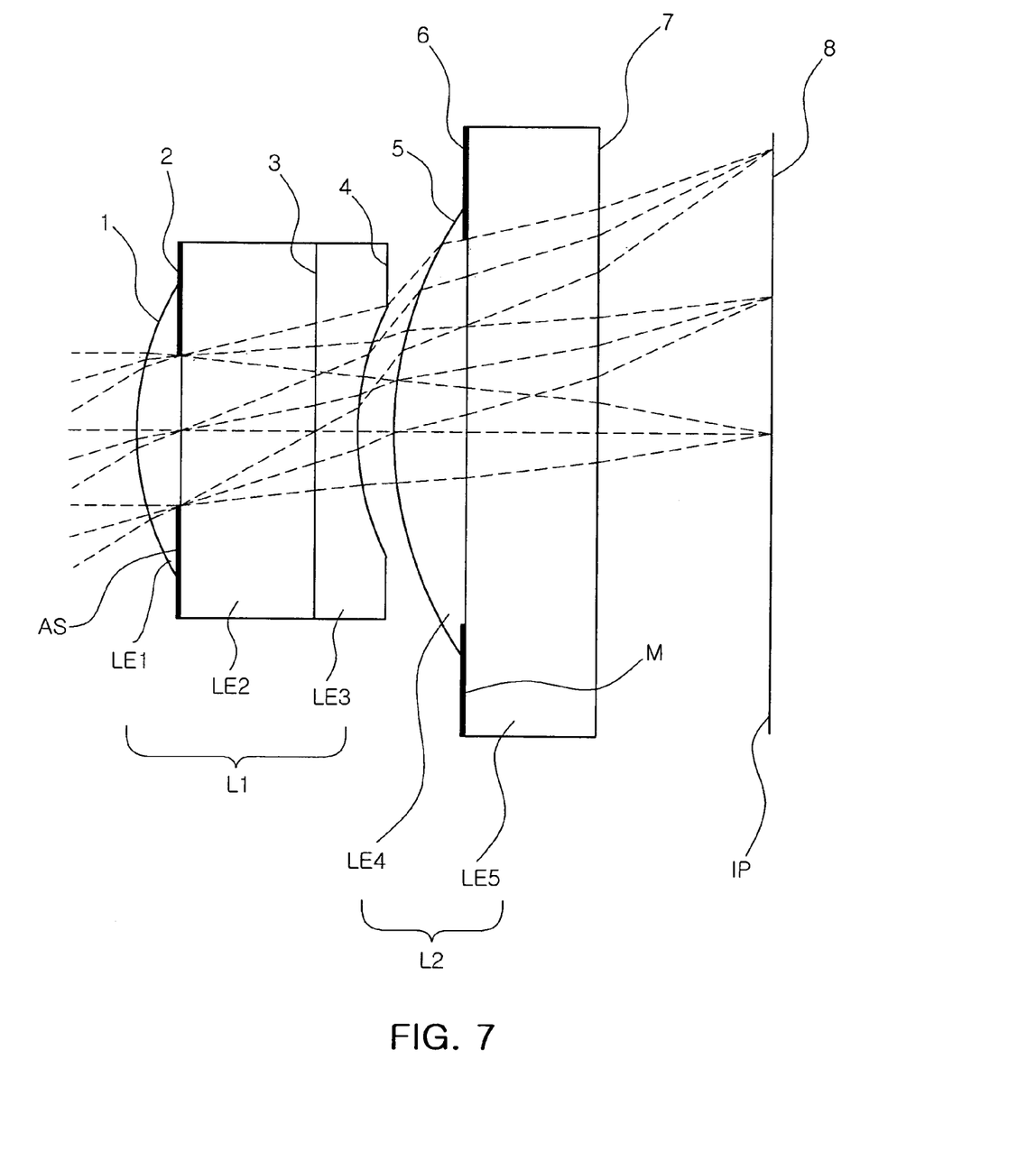
FIG. 7 is a diagram illustrating a lens configuration of a subminiature optical system according to a fourth embodiment of the present invention.

In FIGS. 5 and 7, the shielding layer M is installed on the object-side surface of the fifth optical element LE5. However, the shielding layer M may be installed on the object-side surface or image-side surface of the second optical element LE2 or the image-side surface of the fifth optical element LE5. In this case, the shielding layer M may be installed in a portion out of a path of light incident from the object, may be installed instead of the aperture stop AS, and may be installed separately from the aperture stop AS.

The subminiature optical system may embody subminiaturization by reducing an overall length thereof by using the first lens L1 having the positive refractive power and the second lens L2 having the positive refractive power.

Also, one or more of refractive surfaces included in the first to third optical elements LE1, LE2, and LE3 is formed of an aspherical surface and one of refractive surfaces included in the fourth and fifth optical elements LE4 and LE5 is formed of an aspherical surface, thereby correcting a spherical aberration, astigmatism, and distortion.

As shown in FIG. 1, the first optical element LE1 and second optical element LE2 are cemented to an object-side surface 2 and an image-side surface 3 of the second optical element LE2, respectively.

In this case, the first lens L1 may be formed by using a replica method of laminating polymers on both surfaces of the second optical element LE2 corresponding to a lens substrate, to form the first optical element LE1 and the third optical element LE3. As described above, when a lens of a wafer style is formed by using the replica method, mass production is possible.

However, when one or more of the first optical element LE1, the second optical element LE2, and the third optical element LE3 has a different refractive index from others, the first lens L1 is not limited to be manufactured by using the replica method. That is, aberration correction is capable of being performed by making a refractive index of some of the three optical element forming the first lens L1 be different from others, the first lens L1 may be manufactured by using a general method of manufacturing a cemented lens.

Also, as shown in FIG. 1, in the case of the second lens L2, the fourth optical element LE4 is cemented to an object-side surface 6 of the fifth optical element LE5.

In this case, similar to the first lens L1, the second lens L2 may be formed by using the replica method of laminating polymers on both surfaces of the fifth optical element LE5 corresponding to a lens substrate, to form the fourth optical element LE4. However, when the fourth optical element LE4 and the fifth optical element LE5 are capable of having a different refractive index from each other, the second lens L2 may be manufactured by using the general method of manufacturing a cemented lens.

When the fourth lens LE4 and the fifth optical element LE5 are capable of having a different refractive index from each other, the second lens L2 is not limited to be manufactured by using the replica method. That is, when aberration correction is capable of being performed by making refractive indexes of the tow optical element forming the second lens L2 be different from each other, the second lens L2 may be manufactured by using the general method of manufacturing a cemented lens.

Also, when an image-side surface 7 of the fifth optical element LE5 is formed of a plane, since a number of refractive surfaces to be managed when manufacturing and assembling lenses is reduced, a lens manufacturing process may be simplified and manufacturing costs may be reduced.

On the other hand, all of the object-side surfaces 2 and 6 and the image-side surfaces 3 and 7 of the second optical element LE2 and the fifth optical element LE5 are formed in planes in FIG. 1 but not limited thereto.

That is, to apply a general replica method of easily mass producing, the both surfaces of the second optical element LE2 and the fifth optical element LE5 may be formed in planes, respectively. However, when applying the general method of manufacturing a cemented lens, one or more of the refractive surfaces 2, 3, and 6 of the second optical element LE2 and the fifth optical element LE5 may be formed in one of a spherical and an aspherical surfaces. As described above, when some of the refractive surfaces are formed in a curved surface, a number of refractive surfaces is increased, thereby improving a degree of freedom and forming an optical system having various excellent optical characteristics.

Also, the subminiature optical system may embody excellent aberration characteristics and a high resolution by forming a curved line in an aspherical surface and optimizing a curvature radius of a refractive surface.

As described above, effects of Conditional Expressions 1 to 3 under the described configuration will be described.

$$0.8 < r4/r5 < 1.2 \qquad \text{Conditional Expression 1}$$

wherein r4 indicates a curvature radius of a refractive surface closest to the object from the first lens L1, that is, the image-side surface 4 of the third optical element LE3, and r5 indicates a curvature radius of a refractive surface closest to the object from the second lens L2, that is, the object-side surface 5 of the fourth optical element LE4.

Conditional Expression 1 is a condition on shapes of the first lens L1 and second lens L2.

When r4/r5 becomes smaller than a lower limit of Conditional Expression 1, it is difficult to assemble the first lens L1 and the second lens L2. On the other hand, r4/r5 becomes greater than an upper limit of Conditional Expression 1, it is difficult to correct astigmatism.

$$0.05 < D12/TL < 0.1 \qquad \text{Conditional Expression 2}$$

wherein D12 indicates a distance on an optical axis from a refractive surface closest to the image from the first lens L1, that is, the image-side surface 4 of the third optical element LE3 to a refractive surface closest to the object from the second lens L2, that is, the object-side surface 5 of the fourth optical element LE4, and TL indicates a distance from a refractive surface closest to the object in the first lens to an imaging plane.

Conditional Expression 2 is a condition on a distance between the first lens L1 and the second lens L2.

When the distance between the first lens L1 and the second lens L2 becomes smaller than a lower limit of Conditional Expression 2, it is difficult to assemble the first lens L1 and the second lens L2 due to lack of a distance for assembling. On the other hand, when the distance between the first lens L1 and the second lens L2 becomes greater than an upper limit of Conditional Expression 2, it is impossible to provide a satisfactory back focal length.

$$0.5 < r1/f < 0.7 \qquad \text{Conditional Expression 3}$$

wherein r1 indicates a curvature radius of a refractive surface closest to the object in the first lens L1, that is the object-side surface 1 of the first optical element LE1, and f indicates an overall focal length of the optical system.

Conditional Expression 3 is a condition on a shape of the first lens L1.

When smaller than a lower limit of Conditional Expression 3, sensitivity of the object-side of the first lens L1 is decreased. On the other hand, when greater than an upper limit, the overall length of the optical system becomes great.

Hereinafter, detailed numerical values of embodiments according to the present invention will be described.

As described above, following first to fourth embodiments include the aperture stop AS, the first lens L1, the second L2, the image sensor corresponding to the imaging plane IP sequentially from the object.

The first lens L1 is formed in a meniscus shape entirely convex toward the object and having a positive refractive power. The second lens L2 has an object-side surface convex toward the object and a top surface formed in a plane.

In this case, the first lens L1 includes a first optical element LE1 having an object-side surface convex toward the object on an optical axis, a second optical element LE2 having an object-side surface in contact with an image-side surface of the first optical element LE1, and a third optical element LE3 having an object-side surface in contact with an image-side surface of the second optical element LE2 and an image-side surface concave toward an image on the optical axis, which are totally three.

Also, the second lens L2 may include a fourth optical element LE4 having an object-side surface convex toward the object on the optical axis; and a fifth optical element LE5 having an object-side surface in contact with an image-side surface of the fourth optical element LE4 and an image-side surface formed of a plane, which are totally two.

Also, the aperture stop AS may be installed in front of the object-side surface 2 of the first lens L1 and a shielding layer capable of preventing a flare by shielding from unnecessary light may be installed on one or more of refractive surfaces of the second optical element LE2 and fifth optical element LE5 (refer to M in FIGS. 5 and 7).

Aspherical surfaces used in the respective following examples are obtained from well-known Equation 1.

$$Z = \frac{cY^2}{1 + \sqrt{1 - (1+K)c^2 Y^2}} + AY^4 + BY^6 + CY^8 + DY^{10} + EY^{12} + FY^{14} + \ldots \quad \text{Equation 1}$$

wherein Z indicates a distance from a fixed point on a lens in a direction of an optical axis, Y indicates a distance in a direction vertical to the optical axis, c indicates a reciprocal of a curvature radius at the fixed point on the lens, K indicates a conic constant, and A, B, C, D, E, and F indicate aspherical coefficients.

First Embodiment

Following Table 1 illustrates numerical values according to the first example of the present invention.

Figure 2:
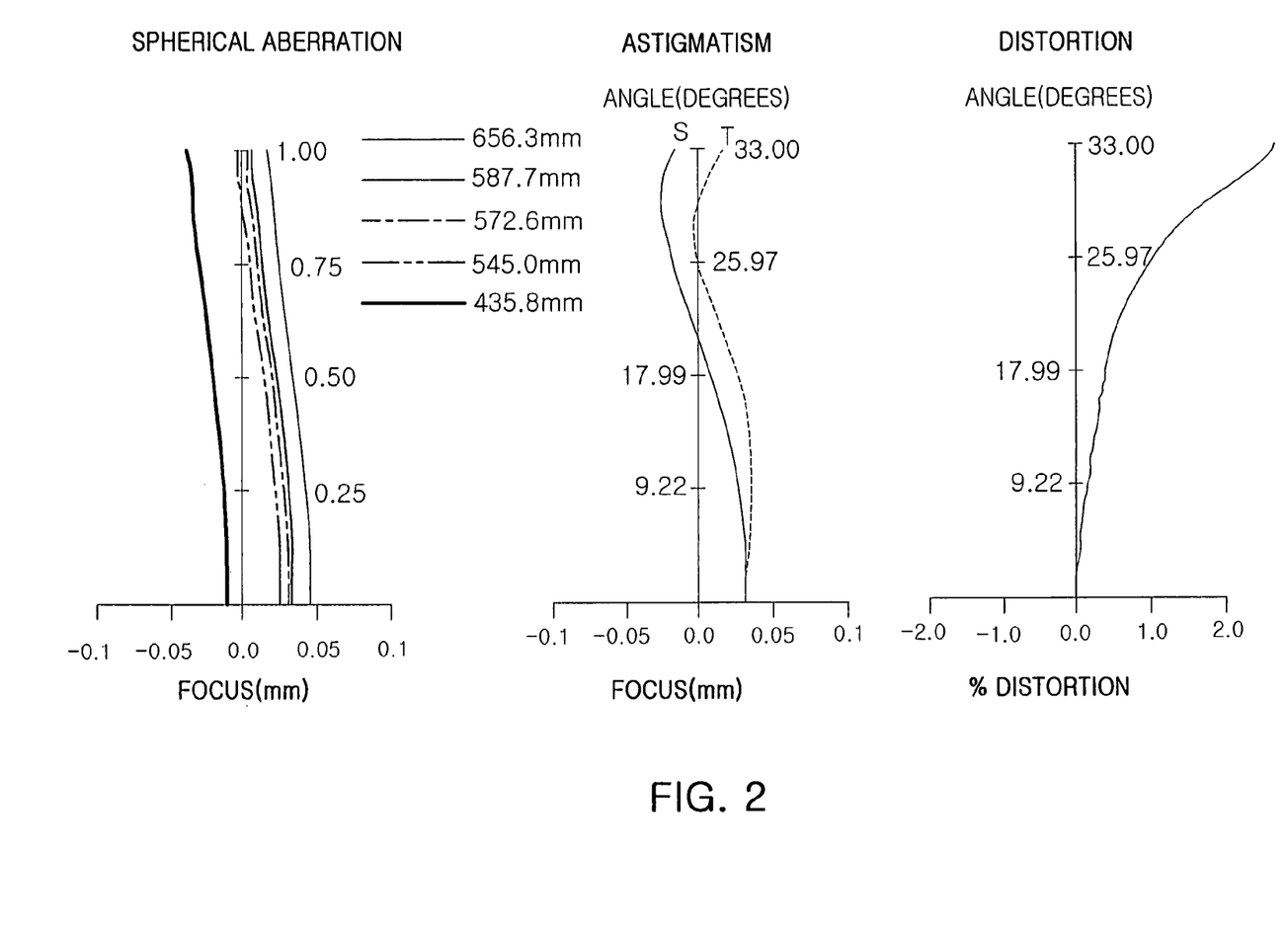
FIG. 2 illustrates aberration diagrams such as a spherical aberration, an astigmatism aberration, and a distortion of the optical system of FIG. 1.

Also, FIG. 1 is a diagram illustrating a lens configuration of the subminiature optical system according to the first embodiment of the present invention and FIG. 2 illustrates aberrations of the optical system of FIG. 1, in which (a) illustrates a spherical aberration, (b) illustrates astigmatism, and (c) illustrates a distortion, respectively. In (b), "S" indicates sagittal and "T" indicates tangential.

In the present embodiment, a viewing angle is 66 degrees, a f-number is 3.0, a distance TL from the object-side surface 1 of the first optical element LE1 to the imaging plane 8 is 1.883 mm, and an effective focal length f of the optical system is 1.343 mm.

In Table 1, a unit of a curvature radius R, a thickness, and a distance t is mm.

TABLE 1

| Number of surface | Curvature radius (R) | Thickness or distance (t) | Refractive index ($N_d$) | Abbe number ($V_d$) | Remarks |
|---|---|---|---|---|---|
| 1 | 0.8645 | 0.166 | 1.59 | 34.0 | First lens |
| 2 | ∞ | 0.400 | 1.52 | 54.5 | |
| 3 | ∞ | 0.123 | 1.48 | 48.5 | |
| *4 | 0.7106 | 0.100 | | | |
| *5 | 0.7466 | 0.224 | 1.59 | 34.0 | Second lens |
| 6 | ∞ | 0.400 | 1.52 | 54.5 | |
| 7 | ∞ | 0.470 | | | |
| 8 | ∞ | — | | | Imaging plane | wherein * indicates an aspherical surface, and a fourth surface that is the image-side surface of the third optical element and a fifth surface that is the object-side surface of the fourth optical element are formed of aspherical surfaces in the first embodiment.

Aspherical coefficients of the first embodiment, obtained by Equation 1, are as shown in following Table 2.

TABLE 2

| Number of surface | K | A | B | C |
|---|---|---|---|---|
| 4 | −14.2594 | 0.5923 | 3.2874 | −7.8026 |
| 5 | −10.8461 | 0.0399 | 0.4377 | −0.3847 |

Second Embodiment

Following Table 3 illustrates numerical values according to the second embodiment of the present invention.

Figure 3:
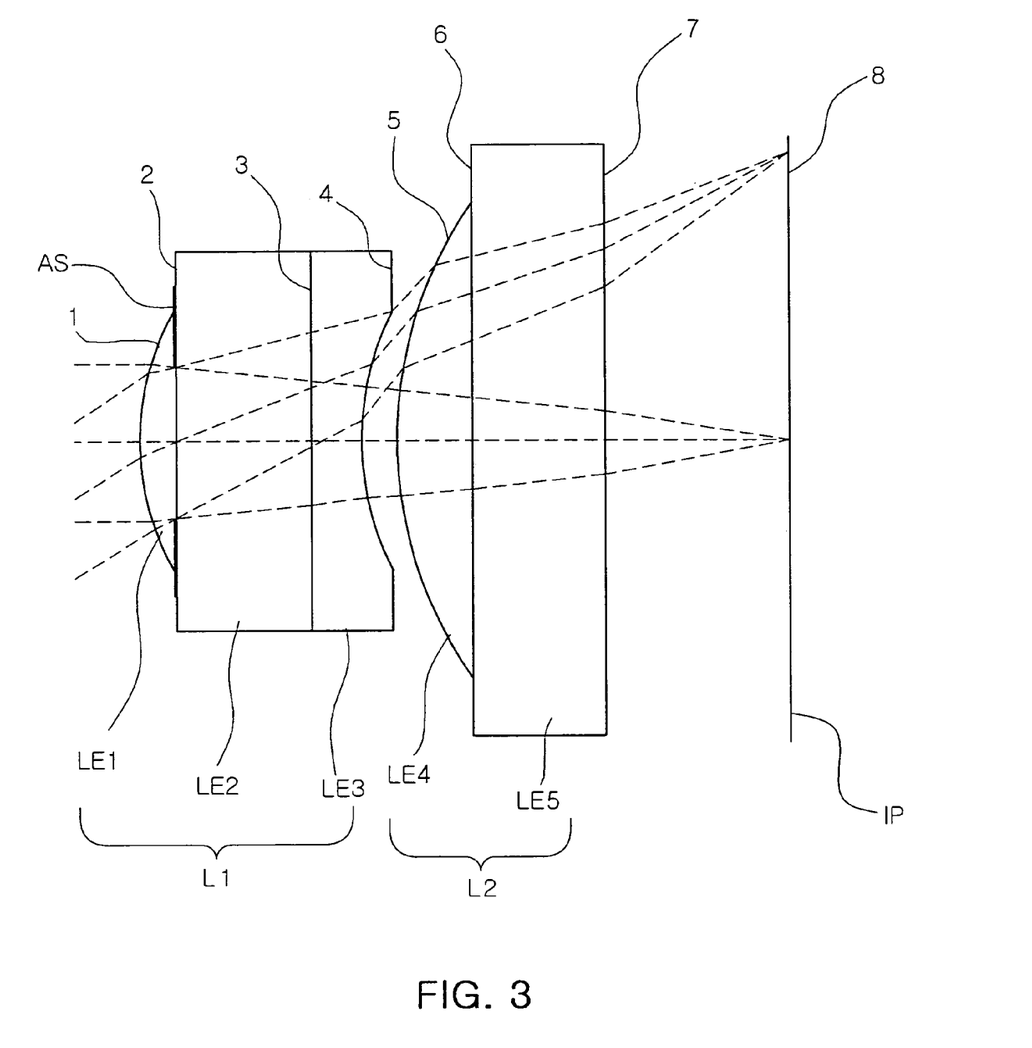
FIG. 3 is a diagram illustrating a lens configuration of a subminiature optical system according to a second embodiment of the present invention.
Figure 4:
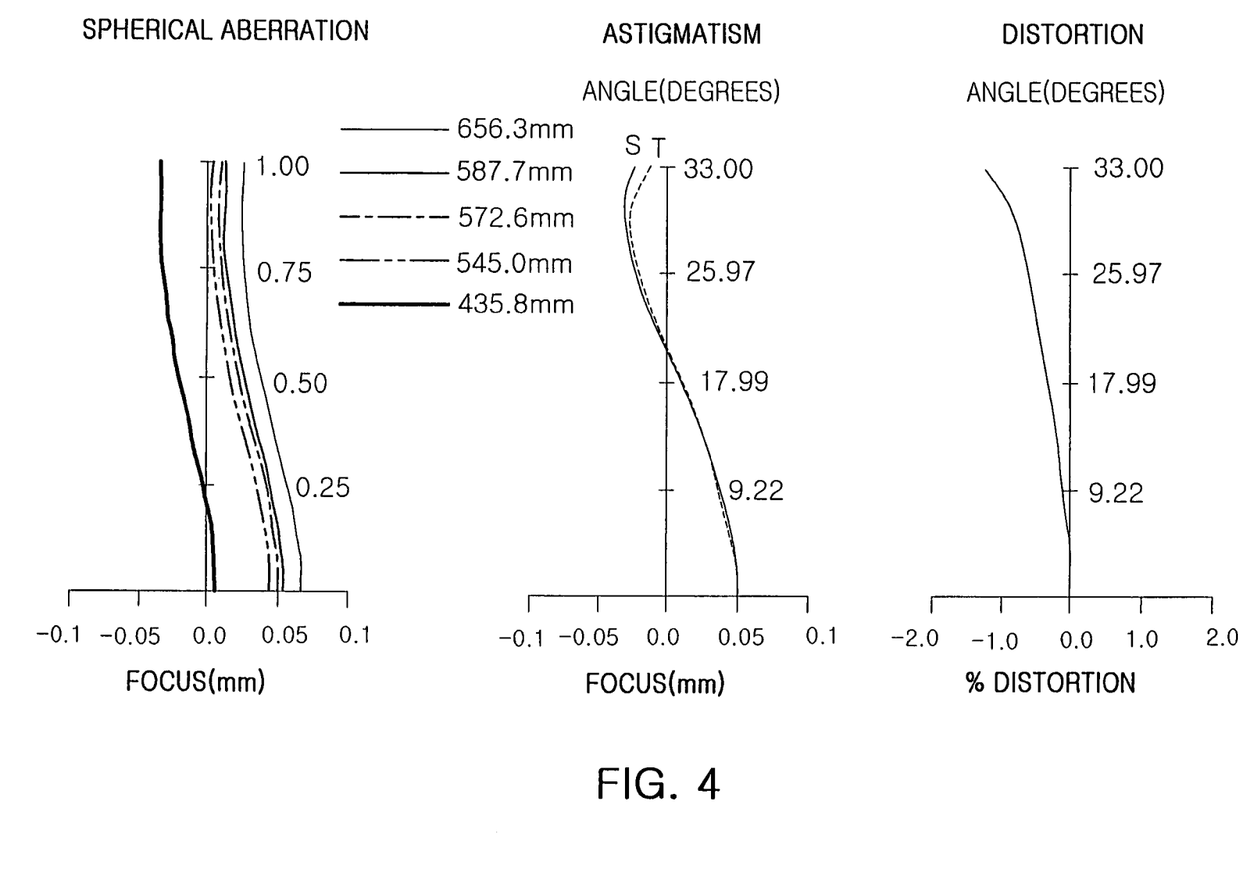
FIG. 4 illustrates aberration diagrams such as a spherical aberration, an astigmatism aberration, and a distortion of the optical system of FIG. 3.

Also, FIG. 3 is a diagram illustrating a lens configuration of a subminiature optical system according to the second embodiment of the present invention and FIG. 4 illustrates aberrations of the optical system of FIG. 3, in which (a) illustrates a spherical aberration, (b) illustrates astigmatism, and (c) illustrates a distortion, respectively.

In the present embodiment, a viewing angle is 66 degrees, a f-number is 3.0, a distance TL from the object-side surface 1 of the first lens element LE1 to the imaging plane 8 is 1.935 mm, and an effective focal length f of the optical system is 1.41 mm.

In Table 3, a unit of a curvature radius R, a thickness, and a distance t is mm.

TABLE 3

| Number of surface | Curvature radius (R) | Thickness or distance (t) | Refractive index ($N_d$) | Abbe number ($V_d$) | Remarks |
|---|---|---|---|---|---|
| *1 | 0.9178 | 0.110 | 1.59 | 34.0 | First lens |
| 2 | ∞ | 0.400 | 1.52 | 54.5 | |
| 3 | ∞ | 0.150 | 1.48 | 48.5 | |
| *4 | 0.6762 | 0.105 | | | |

TABLE 3-continued

| Number of surface | Curvature radius (R) | Thickness or distance (t) | Refractive index ($N_d$) | Abbe number ($V_d$) | Remarks |
|---|---|---|---|---|---|
| *5 | 0.7212 | 0.220 | 1.59 | 34.0 | Second lens |
| 6 | ∞ | 0.400 | 1.52 | 54.6 | |
| 7 | ∞ | 0.550 | | | |
| 8 | ∞ | — | | | Imaging plane | wherein * indicates an aspherical surface, and a first surface that is the object-side surface of the first optical element, a fourth surface that is the image-side surface of the third optical element and a fifth surface that is the object-side surface of the fourth optical element are formed of aspherical surfaces in the second embodiment.

The aspherical coefficients of the second embodiment, obtained by Equation 3, are as shown in following Table 4.

TABLE 4

| Number of surface | K | A | B | C |
|---|---|---|---|---|
| 1 | 0.1600 | −0.0803 | | |
| 4 | −20.6679 | 1.1443 | −0.3321 | −2.1492 |
| 5 | −12.3249 | 0.2591 | −0.1614 | 0.0952 |

Third Embodiment

Following Table 5 illustrates numerical values according to the third example of the present invention.

Figure 6:
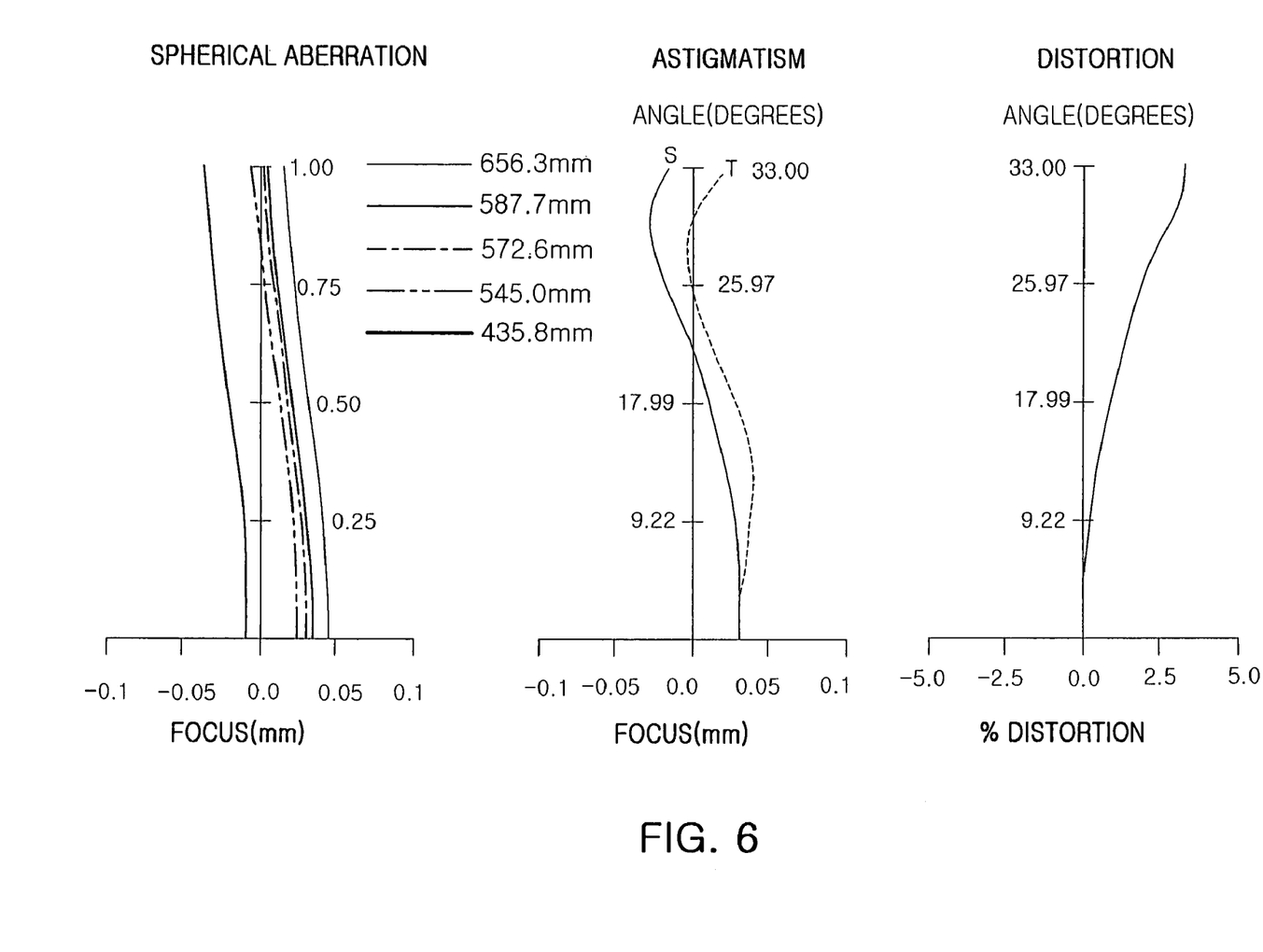
FIG. 6 illustrates aberration diagrams such as a spherical aberration, an astigmatism aberration, and a distortion of the optical system of FIG. 5.

Also, FIG. 5 is a diagram illustrating a lens configuration of the subminiature optical system according to the second embodiment of the present invention and FIG. 6 illustrates aberrations of the optical system of FIG. 5, in which (a) illustrates a spherical aberration, (b) illustrates astigmatism, and (c) illustrates a distortion, respectively.

In the present embodiment, a viewing angle is 66 degrees, a f-number is 3.0, a distance TL from the object-side surface 1 of the first lens element LE1 to the imaging plane 8 is 1.908 mm, and an effective focal length f of the optical system is 1.33 mm.

In Table 5, a unit of a curvature radius R, a thickness, and a distance t is mm.

TABLE 5

| Number of surface | Curvature radius (R) | Thickness or distance (t) | Refractive index ($N_d$) | Abbe number ($V_d$) | Remarks |
|---|---|---|---|---|---|
| 1 | 0.8759 | 0.220 | 1.59 | 34.0 | First lens |
| 2 | ∞ | 0.400 | 1.52 | 54.5 | |
| 3 | ∞ | 0.150 | 1.48 | 48.5 | |
| *4 | 0.7693 | 0.108 | | | |
| *5 | 0.7640 | 0.230 | 1.59 | 34.0 | Second lens |
| 6 | ∞ | 0.400 | 1.52 | 54.5 | |
| 7 | ∞ | 0.400 | | | |
| 8 | ∞ | — | | | Imaging plane | wherein * indicates an aspherical surface, and a fourth surface that is the image-side surface of the third optical element and a fifth surface that is the object-side surface of the fourth optical element are formed of aspherical surfaces in the third embodiment.

The aspherical coefficients of the third embodiment, obtained by Equation 1, are as shown in following Table 6.

TABLE 6

| Number of surface | K | A | B | C |
|---|---|---|---|---|
| 4 | −20.8658 | 0.7448 | 3.5191 | −13.3958 |
| 5 | −13.4559 | 0.2062 | 0.0203 | −0.0589 |

Fourth Embodiment

Following Table 7 illustrates numerical values according to the fourth example of the present invention.

Figure 8:
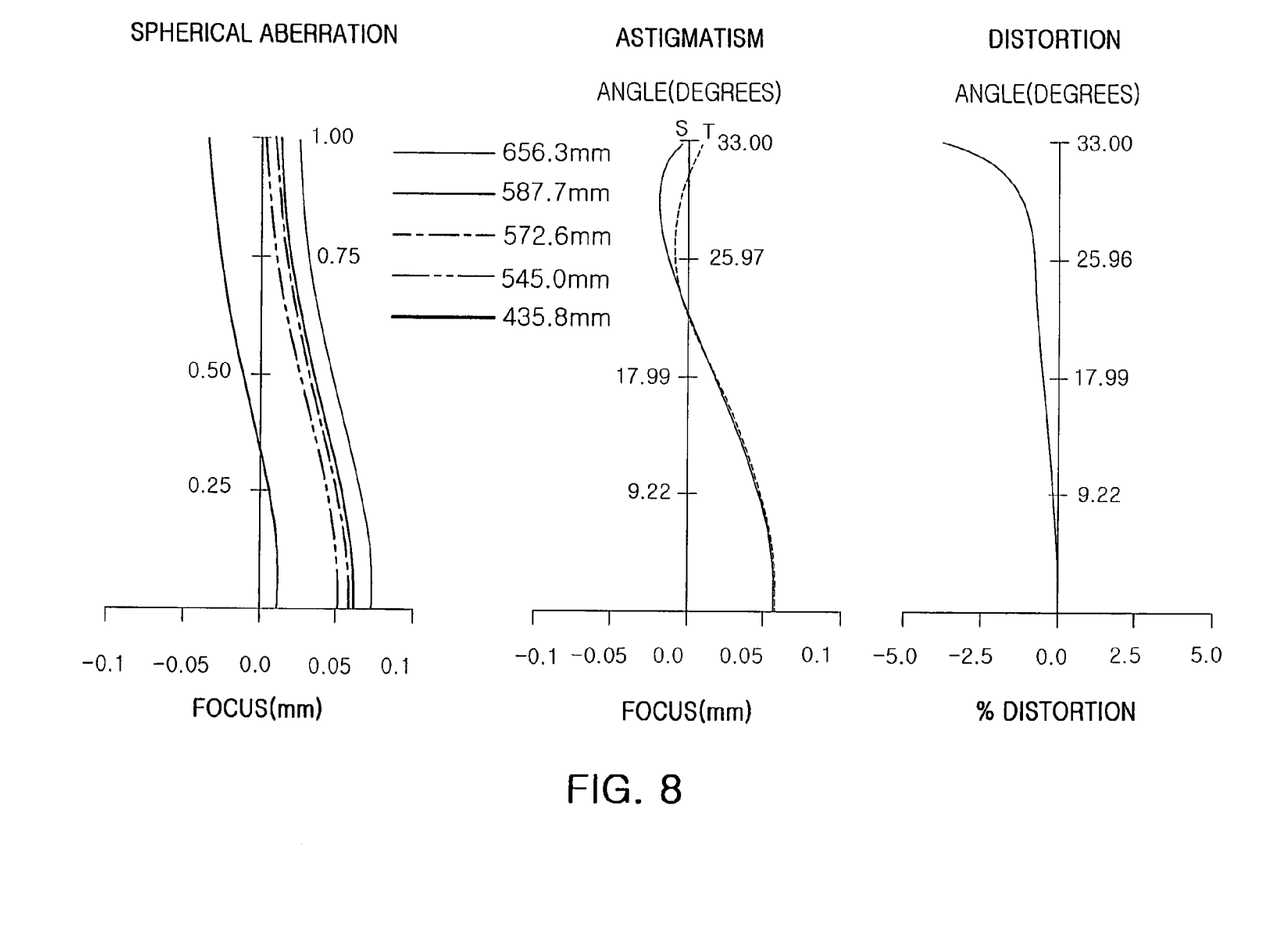
FIG. 8 illustrates aberration diagrams such as a spherical aberration, an astigmatism aberration, and a distortion of the optical system of FIG. 7.

Also, FIG. 7 is a diagram illustrating a lens configuration of the subminiature optical system according to the fourth embodiment of the present invention and FIG. 8 illustrates aberrations of the optical system of FIG. 7, in which (a) illustrates a spherical aberration, (b) illustrates astigmatism, and (c) illustrates a distortion, respectively.

In the present embodiment, a viewing angle is 66 degrees, an f-number is 3.0, a distance TL from the object-side surface 1 of the first optical element LE1 to the imaging plane 8 is 1.922 mm, and an effective focal length f of the optical system is 1.42 mm.

In Table 7, a unit of a curvature radius R, a thickness, and a distance t is mm.

TABLE 7

| Number of surface | Curvature radius (R) | Thickness or distance (t) | Refractive index ($N_d$) | Abbe number ($V_d$) | Remarks |
|---|---|---|---|---|---|
| 1 | 0.8866 | 0.140 | 1.59 | 34.0 | First lens |
| 2 | ∞ | 0.400 | 1.52 | 54.5 | |
| 3 | ∞ | 0.130 | 1.48 | 48.5 | |
| *4 | 0.6959 | 0.110 | | | |
| *5 | 0.7703 | 0.220 | 1.59 | 34.0 | Second lens |
| 6 | ∞ | 0.400 | 1.52 | 54.5 | |
| 7 | ∞ | 0.522 | | | |
| 8 | ∞ | — | | | Imaging plane | wherein * indicates an aspherical surface, and a fourth surface that is the image-side surface of the third optical element and a fifth surface that is the object-side surface of the fourth optical element are formed of aspherical surfaces in the fourth embodiment.

The aspherical coefficients of the fourth embodiment, obtained by Equation 1, are as shown in following Table 8.

TABLE 8

| Number of surface | K | A | B | C |
|---|---|---|---|---|
| 4 | −18.5495 | 1.3462 | −0.5564 | −2.9774 |
| 5 | −12.1209 | 0.2851 | −0.1210 | 0.0225 |

On the other hand, values obtained by Conditional Expressions 1 to 3 with respect to the first to fourth embodiments are as following Table 9.

TABLE 9

|  | Conditional Expression 1 (r4/r5) | Conditional Expression 2 (D12/TL) | Conditional Expression 3 (r1/f) |
|---|---|---|---|
| First Embodiment | 0.9518 | 0.0531 | 0.6437 |
| Second Embodiment | 0.9376 | 0.0543 | 0.6509 |
| Third Embodiment | 1.0069 | 0.0566 | 0.6586 |
| Fourth Embodiment | 0.9035 | 0.0572 | 0.6243 |

Via the described embodiments, it may be known that it is possible to obtain the subminiature optical system having excellent aberration characteristics as illustrated in FIGS. 2, 4, 6, and 8.

While the present invention has been shown and described in connection with the exemplary embodiments, it will be apparent to those skilled in the art that modifications and variations can be made without departing from the spirit and scope of the invention as defined by the appended claims.

What is claimed is:

1. An optical system comprising:
   a first lens formed in a meniscus shape entirely convex toward an object, having a positive refractive power, and having object and image side surfaces in contact with air; and
   a second lens having an object-side surface convex toward the object and an image-side surface formed of a plane, wherein the second lens comprises
      a first optical element having an object-side surface entirety convex toward the object, and
      a second optical element having an object-side surface in contact with an image-side surface of the second optical element, and an image-side surface in contact with air, said image-side surface and said object-side surface formed entirely of planes respectively.

2. The optical system of claim 1, wherein the first lens comprises:
   a first optical element having an object-side surface convex toward the object on an optical axis;
   a second optical element having an object-side surface in contact with an image-side surface of the first optical element of the first lens; and
   a third optical element having an object-side surface in contact with an image-side surface of the second optical element of the first lens and an image-side surface concave toward an image on the optical axis.

3. The system of claim 2, wherein the object-side surface and the image-side surface of the second optical element of the first lens are formed of planes, respectively.

4. The system of claim 2, wherein the first lens comprises one or more refractive surface formed of aspherical surface.

5. The system of claim 2, wherein a refractive index of one or more of the first optical element of the first lens to the third optical element of the first lens is different from a refractive index of other optical elements, and
   a refractive index of the first optical element of the second lens is different from that of the second optical element of the second lens.

6. The system according to claim 1, wherein the second lens has a positive refractive power.

7. The system according to claim 1, wherein a curvature radius r4 of a refractive surface closest to the image in the first lens and a curvature radius r5 closest to the object in the second lens satisfy following Conditional Expression 1, $0.8 < r4/r5 < 1.2$  Conditional Expression 1, 8. The system of claim 7, wherein a distance D12 on the optical axis from the refractive surface closest to the image in the first lens to the refractive surface closest to the object in the second lens satisfy following Conditional Expression 2, $0.05 < D12/TL < 0.1$  Conditional Expression 2 wherein TL indicates a distance from the refractive surface closest to the object to an imaging plane.

9. The system of claim 7, wherein a curvature radius r1 of a refractive surface closest to the object in the first lens satisfy following Conditional Expression 3, $0.5 < r1/f < 0.7$  Conditional Expression 3 wherein f indicates an overall focal length of the optical system.

10. The system of claim 2, wherein a shielding layer blocking unnecessary light is installed on one or more of refractive surfaces included in the second optical element of the first lens and second optical element of the second lens.

* * * * *

UNITED STATES PATENT AND TRADEMARK OFFICE
CERTIFICATE OF CORRECTION

| | | |
|---|---|---|
| PATENT NO. | : 7,764,445 B2 | Page 1 of 1 |
| APPLICATION NO. | : 12/076011 | |
| DATED | : July 27, 2010 | |
| INVENTOR(S) | : Hye Ran Oh et al. | |

It is certified that error appears in the above-identified patent and that said Letters Patent is hereby corrected as shown below:

Column 11, Line 36 delete "the second" and insert --the first--.

Signed and Sealed this
Fifteenth Day of February, 2011

David J. Kappos
*Director of the United States Patent and Trademark Office*